(12) United States Patent
Kawada et al.

(10) Patent No.: US 7,504,798 B2
(45) Date of Patent: Mar. 17, 2009

(54) WIPER CONTROLLER AND METHOD FOR CONTROLLING WIPER

(75) Inventors: Mitsuhiro Kawada, Aichi (JP); Tadaaki Ichizono, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 163 days.

(21) Appl. No.: 11/435,235

(22) Filed: May 16, 2006

(65) Prior Publication Data

US 2006/0261768 A1 Nov. 23, 2006

(30) Foreign Application Priority Data

May 17, 2005 (JP) ............... 2005-144281

(51) Int. Cl.
*H02P 1/34* (2006.01)
*H02P 7/00* (2006.01)

(52) U.S. Cl. .................. 318/821; 318/443; 318/444

(58) Field of Classification Search ......... 318/443–444, 318/821; 180/53.8
See application file for complete search history.

(56) References Cited

U.S. PATENT DOCUMENTS

| | | | | |
|---|---|---|---|---|
| 4,740,735 A | * | 4/1988 | Hayashi | 318/483 |
| 4,760,285 A | * | 7/1988 | Nelson | 327/511 |
| 5,200,676 A | * | 4/1993 | Mueller et al. | 318/444 |
| 5,404,085 A | * | 4/1995 | Resch et al. | 318/443 |
| 5,412,296 A | * | 5/1995 | Chien et al. | 318/444 |
| 5,648,707 A | * | 7/1997 | Salliotte | 318/443 |
| 5,694,011 A | * | 12/1997 | Corey et al. | 318/444 |
| 6,140,785 A | * | 10/2000 | Hogler | 318/282 |
| 6,400,110 B1 | * | 6/2002 | Yabe et al. | 318/443 |
| 2003/0117102 A1 | * | 6/2003 | Moosmann et al. | 318/DIG. 2 |

FOREIGN PATENT DOCUMENTS

JP 5-24513 2/1993
JP 10-315919 12/1998

* cited by examiner

*Primary Examiner*—Glenn A Auve
*Assistant Examiner*—Nimesh G Patel
(74) *Attorney, Agent, or Firm*—Patterson, Thuente, Skaar & Christensen, P.A.

(57) ABSTRACT

A controller for controlling a wiper unit including a wiper and an intermittent wipe cycle setting device for setting an intermittent wipe cycle of the wiper. The cycle setting device is set at a plurality of positions respectively corresponding to different intermittent wipe cycles. Further, the cycle setting device has a resistance value, which changes in accordance with each of the positions, and generates an output signal, which is in accordance with the change in the resistance value. The controller computes position information of the intermittent wipe cycle setting device from the output signal by using a learned value. The computer adjusts the learned value in accordance with the computation result of the position information to correct the position information. Accordingly, resistance value variances of the intermittent wipe cycle setting device are automatically corrected.

6 Claims, 3 Drawing Sheets

US 7,504,798 B2

WIPER CONTROLLER AND METHOD FOR CONTROLLING WIPER

BACKGROUND OF THE INVENTION

The present invention relates to a wiper controller and a method for controlling a wiper.

A wiper unit for use in an automobile includes a wiper and an intermittent wipe cycle setting device. When the wiper is intermittently wiping a windshield glass, the cycle setting device, which may include a knob, is operated by a passenger to adjust the cycle in which the wiper wipes the windshield (refer to, for example, Japanese Laid-Open Patent Publication No. 10-315919).

The cycle setting device includes a resistor circuit (volume), the resistance value of which varies in accordance with the position (e.g., knob position) of the cycle setting device. The intermittent wipe cycle of the wiper is adjusted in accordance with the resistance value of the resistor circuit.

However, the resistance value of the resistor circuit may differ between cycle setting devices. Thus, when using the resistance value of the resistor circuit to control the intermittent wipe cycle, the wipe cycle may not be properly adjusted. More specifically, the wiper may not be supplied with voltage that is in accordance with the position of the cycle setting device. Thus, the intermittent wipe cycle may not be controlled in accordance with the position of the cycle setting device.

For example, the variance tolerance for the resistance value of the resistor circuit may be ±30% relative to a reference resistance value, as shown in FIG. 4. In such a case, when the cycle setting device is located at a position where the resistance value of the resistor circuit becomes maximum (i.e., maximum wipe cycle position P4) and the reference resistance value at this position is 1000Ω, the resistor circuit may have a resistance value of only 700Ω. This resistance value is less than the reference resistance value of 750Ω for position P3. With such a cycle setting device, even when the cycle setting device is located at the maximum wipe cycle position P4, the wipe cycle of the wiper may not be maximum. Therefore, the wipe cycle must be corrected. However, due to the variance between different cycle setting devices, the correction must be performed for each cycle setting device. Such processing is burdensome.

SUMMARY OF THE INVENTION

The present invention provides a wiper controller for automatically correcting resistance value variations in an intermittent wipe cycle setting device.

One aspect of the present invention is a controller for controlling a wiper unit including a wiper and an intermittent wipe cycle setting device for setting an intermittent wipe cycle of the wiper. The intermittent wipe cycle setting device is set at a plurality of positions respectively corresponding to different intermittent wipe cycles. The intermittent wipe cycle setting device has a resistance value that changes in accordance with each of the positions. The intermittent wipe cycle setting device generates an output signal that is in accordance with the change in the resistance value. The controller includes a computer, connected to the intermittent wipe cycle setting device, for computing position information of the intermittent wipe cycle setting device from the output signal by using a learned value. The computer adjusts the learned value in accordance with the computation result of the position information to correct the position information.

A further aspect of the present invention is a method for controlling a wiper unit including a wiper and an intermittent wipe cycle setting device for setting an intermittent wipe cycle of the wiper. The intermittent wipe cycle setting device is set at a plurality of positions respectively corresponding to different intermittent wipe cycles. The intermittent wipe cycle setting device has a resistance value that changes in accordance with each of the positions. The intermittent wipe cycle setting device generates an output signal that is in accordance with the change in the resistance value. The method includes computing position information of the intermittent wipe cycle setting device from the output signal by using a learned value, and correcting the position information by adjusting the learned value in accordance with the computation result of the position information.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A wiper controller according to a preferred embodiment of the present invention will now be described with reference to the drawings.

Figure 1:
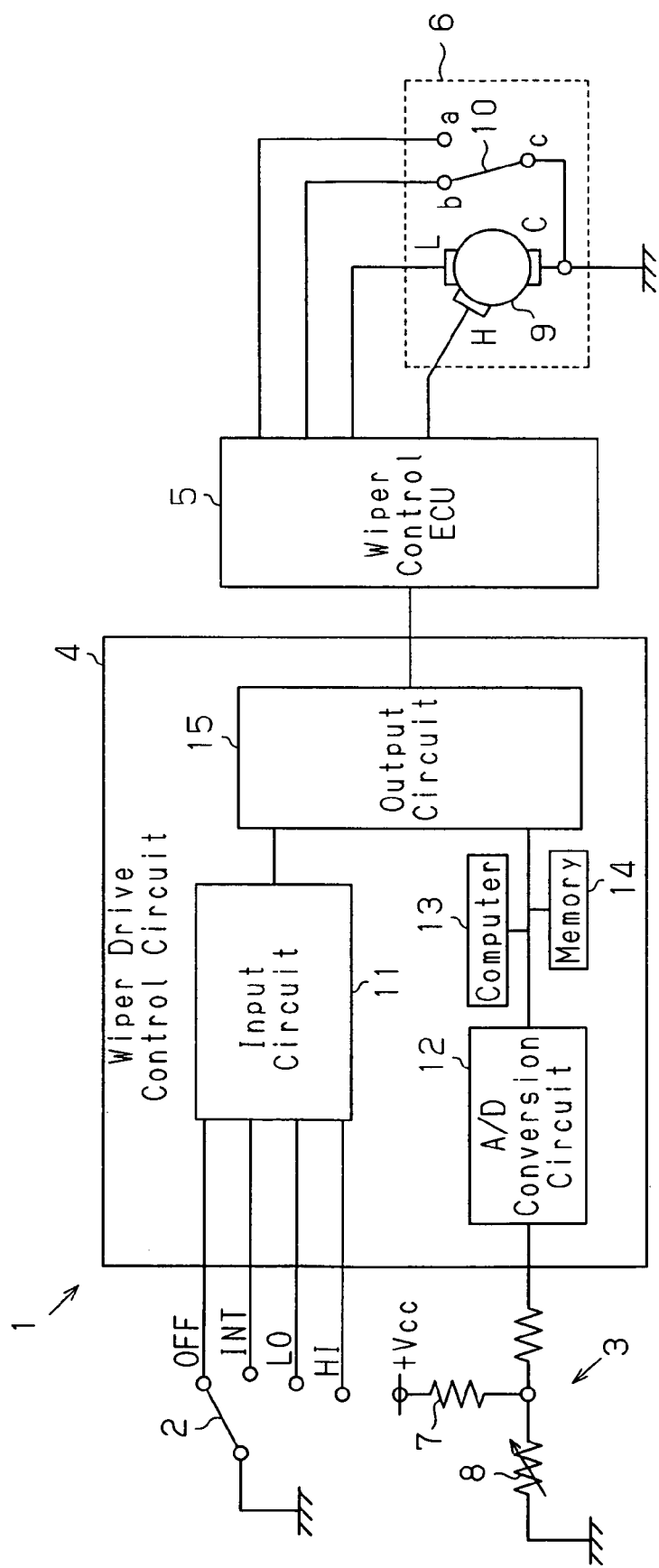
FIG. 1 is a schematic block diagram of a wiper unit according to a preferred embodiment of the present invention.

As shown in FIG. 1, a wiper unit 1 includes a wiper switch 2, an intermittent wipe cycle setting device 3 (volume), a wiper drive control circuit 4 connected to the wiper switch 2 and the cycle setting device 3, a wiper control ECU 5 connected to the wiper drive control circuit 4, and a wiper driver 6 connected to the wiper control ECU 5. In the preferred embodiment, the wiper control ECU 5 and the wiper driver 6 form a wiper drive unit.

The wiper switch 2 is switched between a plurality of positions in accordance with the operation of a wiper lever (not shown), which is arranged in, for example, the passenger compartment. In the preferred embodiment, the wiper switch 2 is switched between an off position "OFF", an intermittent wipe mode position "INT", a low speed wipe mode position "LO", and a high speed wipe mode position "HI". The wiper drive control circuit 4 receives a signal indicating the position of the wiper switch 2.

The cycle setting device 3 is arranged at, for example, the distal portion of the wiper lever. A knob, which is provided on the distal end of the wiper lever, is rotated to vary the resistance value of the cycle setting device 3. This sets the intermittent wiper cycle of the wiper. In the preferred embodiment, the knob is rotated between positions P1 to P4 (refer to FIG. 3) to set the intermittent wipe cycle at one of four cycles.

The cycle setting device 3 includes a voltage divider, which is connected between a constant voltage terminal (reference voltage +Vcc) and a ground terminal. A pullup resistor 7, which is a fixed resistor, and a variable resistor 8 are connected in series between the constant voltage terminal and the ground terminal. A node between the pullup resistor 7 and the variable resistor 8 is connected to the wiper drive control circuit 4 via a resistor. With this configuration, the cycle setting device generates a signal having a voltage level that is in accordance with the ratio between the resistance value R7 of the pullup resistor 7 and the resistance value R8 of the variable resistor 8.

The wiper drive control circuit 4 transmits a signal, which is based on the signals received from the wiper switch 2 and the cycle setting device 3, to the wiper control ECU 5. The signal transmitted to the wiper control ECU 5 includes information indicating the position of the wiper switch 2 and information indicating the position of the cycle setting device 3. The wiper control ECU 5 drives and controls the wiper driver 6 based on the signal received from the wiper drive control circuit 4.

The wiper driver 6 includes a wiper motor 9 and a fixed position stop switch 10. The wiper motor 9 produces rotation that can be switched between two speeds. Further, the wiper motor 9 includes a high rotation speed terminal H and a low rotation speed terminal L, which are connected to the wiper control ECU 5, and a common terminal C, which is connected to ground. The fixed position stop switch 10 has a known configuration in which contacts c and b are connected when the wiper is in a standby position and contacts c and a are connected when the wiper motor 9 is activated and the wiper moves from the standby state. The normally open contact a and the normally closed contact b are connected to the wiper control ECU 5, and the common terminal c is connected to ground.

The wiper control ECU 5 supplies the wiper motor 9 with drive current via the low rotation speed terminal L when the wiper switch 2 is located at the low speed wipe mode position "LO". Further, the wiper control ECU 5 supplies the wiper motor 9 with drive current via the high rotation speed terminal H when the wiper switch 2 is located at the high speed wipe mode position "HI". The wiper motor 9 produces rotation at a low speed or a high speed in accordance with the supplied drive current to wipe the windshield glass at a low speed or a high speed. When the wiper switch 2 is located at the off position "OFF", the wiper control ECU 5 does not supply the wiper motor 9 with drive current. Thus, the wiper motor 9 does not produce rotation.

When the wiper switch 2 is located at the intermittent wipe mode position "INT", the wiper control ECU 5 intermittently supplies the wiper motor 9 with drive current via the low rotation speed terminal K based on the state of the fixed position stop switch 10 to intermittently drive the wiper motor 9, or the wiper. In this state, the wiper control ECU 5 changes the intermittent drive cycle, or the intermittent wipe cycle of the wiper, based on position information indicating the position of the knob, that is, the position of the cycle setting device 3.

The wiper drive control circuit 4 will now be described in detail. The wiper drive control circuit 4 includes an input circuit 11 for receiving a signal from the wiper switch 2, an A/D conversion circuit 12 for receiving voltage from the cycle setting device 3, a computer 13 for computing a learned value and a correction value for the position information of the cycle setting device 3 based on the output value of the A/D conversion circuit 12, a memory 14 for storing the computation results and etc. of the computer 13, and an output circuit 15. The A/D conversion 12, the computer 13, the memory 14, and the output circuit 15 are connected to each other. The output circuit 15 transmits the correction value obtained by the computer 13 and the signal received from the input circuit 11 to the wiper control ECU 5. In the preferred embodiment, a wiper controller includes the A/D conversion circuit 12, the computer 13, the memory 14, and the output circuit 15.

The computer 13 computes the resistance value of the variable resistor 8 from the output signal of the A/D conversion circuit 12. Then, the computer 13 computes a correction value by correcting the computed resistance value based on the learned value. The output signal of the A/D conversion circuit 12 has a digital value that is in accordance with a divided voltage Vin obtained by dividing the potential difference between the cycle setting device 3, or the reference voltage Vcc, and ground by the resistance ratio of the pullup resistor 7 and the variable resistor 8. The computer 13 uses the equation shown below to compute the resistance value R8 of the variable resistor 8 from the digital value of the divided voltage Vin, the resistance value R7 of the pullup resistor 7, and the digital value of the reference voltage Vcc.

$$R8 = R7 \times (Vin/(Vcc-Vin))$$

The resistance value R7 of the pullup resistor 7 and the value of the reference voltage Vcc are stored in the memory 14. The computer 13 uses these values and the value of the divided voltage Vin to compute the resistance value R8 of the variable resistor 8. Based on the resistance value R8, the computer 13 determines the one of the positions P1 to P4 at which the knob is located.

However, there is a variance in the resistance value R8 between different variable resistors 8. Therefore, even if the knob is located at the same position, the divided voltage Vin may differ due to such a variance of the variable resistor 8. This results in differences between computed resistance values. Thus, during the computation, the resistance value R7, that is, the resistance value of the pullup resistor 7, is stored as a learned value and the learned value is changed to correct the resistance value of the variable resistor 8. In other words, the learned value of the pullup resistor 7 is changed in accordance with the variance of the variable resistor 8 and corrected to a resistance value that is in accordance with the position of the knob. When the cycle setting device 3 of the wiper unit 1 has a variance, the one of the positions P1 to P4 at which the knob is located may properly be determined by using the correction value.

The computer 13 stores the resistance value R7 of the pullup resistor 7 as the learned value R1 in the memory 14, changes the learned value R1 based on the voltage signal of the cycle setting device 3, and corrects the resistance value of the cycle setting device 3 based on the learned value R1. For example, if the resistance value R8 of the variable resistor 8 is less than the reference value and the voltage output of the cycle setting device 3 cannot be obtained in correspondence with the position at which the wipe cycle is maximum, the computer 13 decrements the learned value R1. The computer 13 then computes the resistance value (correction value Rv) of the variable resistor 8 based on the learned value, the value of the divided voltage Vin, and the value of the reference voltage Vcc. The correction value Rv becomes greater than the actual resistance value R8 when the learned value R1 is decremented. Accordingly, the correction value Rv may be equalized with the reference value.

An example of the correction process performed by the computer 13 will now be described with reference to FIGS. 1 to 3. The computer 13 performs the correction process shown in FIG. 2 based on the signal from the wiper switch 2. A case in which the resistance value of the cycle setting device 3 (variable resistor 8) is equal to the tolerable minimum value, as shown in FIG. 3, will now be discussed.

In the initial setting, the computer 13 stores the resistance value R7 of the pullup resistor 7 as the learned value R1 in the memory 14. The computer 13 also stores a cycle setting device maximum resistance value Rvmax and the value of the reference voltage Vcc (value obtained by A/D converting the reference voltage Vcc, described hereinafter using the same reference characters) in the memory 14. With respect to the actual resistance value R7 of the pullup resistor 7, the learned value R1 is a value at which the correction value and the reference resistance value become equal when the variance of the cycle setting device 3 (variable resistor 8) is maximum. The maximum resistance value Rvmax is the value of the position information transmitted from the output circuit 15 to the wiper control ECU 5 when the knob is operated so that the resistance value becomes maximum, that is, when the knob is arranged at position P4. The wiper control ECU 5 determines the position of the knob based on the value transmitted from the output circuit 15 in accordance with the operation of a cycle setting device employing a variable resistor having the reference resistance value. However, when there is a variance in the resistance value between variable resistors 8, a value obtained through a computation may be greater than the reference resistance value. If the computed value is greater than the reference resistance value, the wiper control ECU 5 cannot properly determine the position of the knob. Accordingly, when the correction value is greater than the reference resistance value, the correction value is equalized with the reference resistance value so that the wiper control ECU 5 properly determines the knob position.

Figure 2:
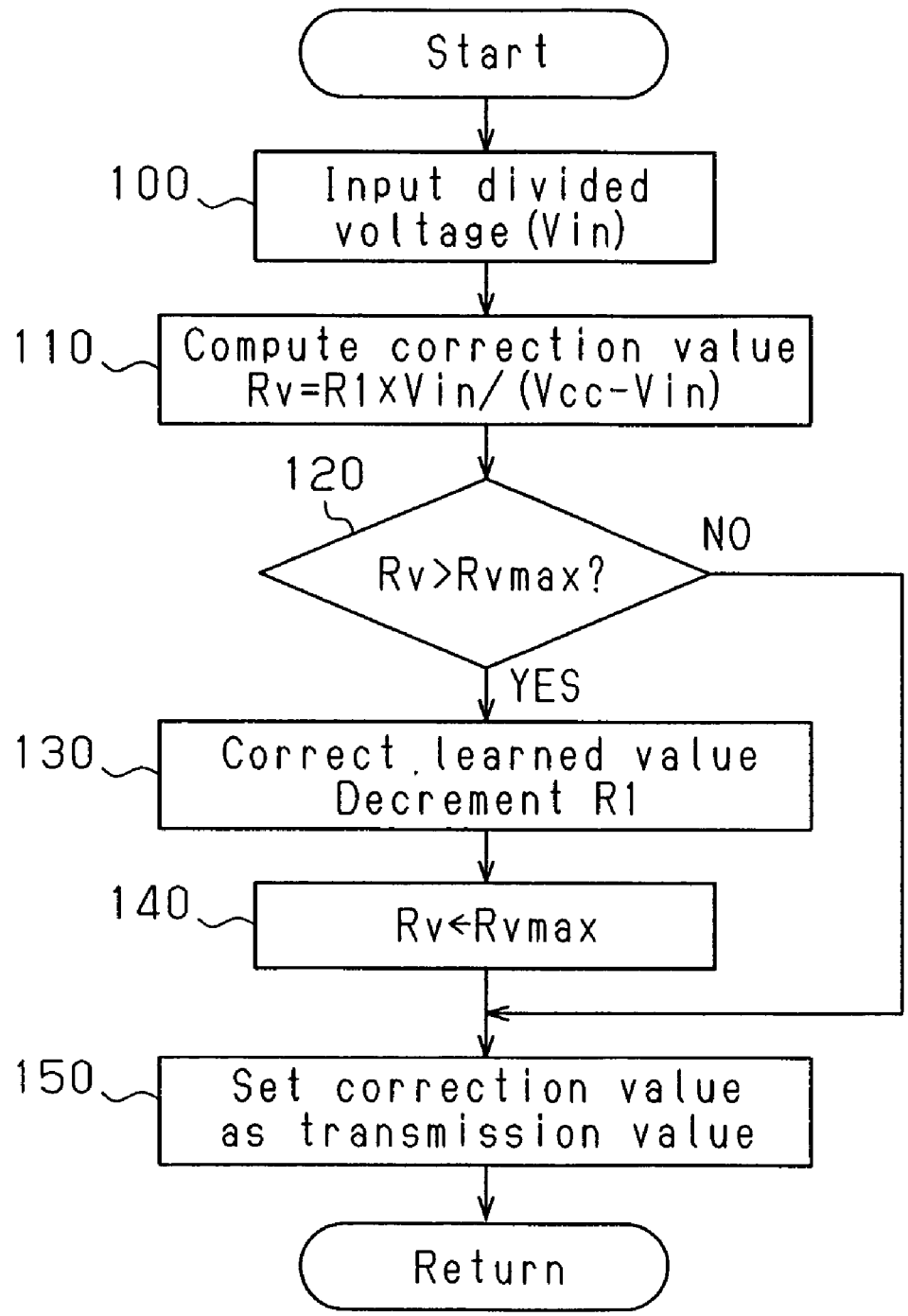
FIG. 2 is a flowchart showing a process for correcting the resistance value of an intermittent wipe cycle setting device.
Figure 3:
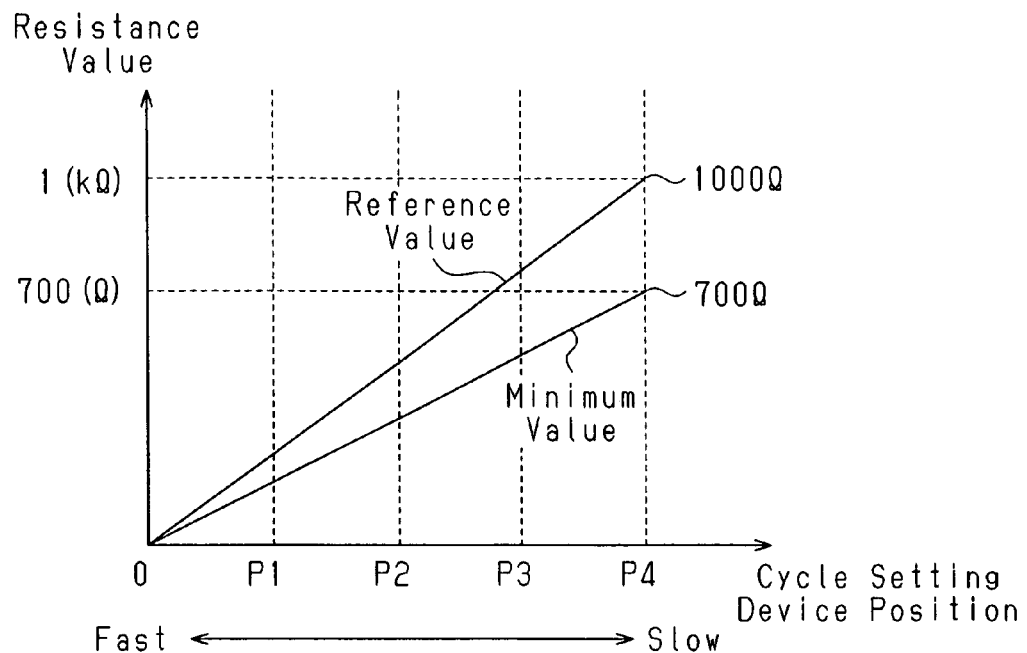
FIG. 3 is a characteristic chart showing the relationship between the position of the intermittent wipe cycle setting device and the resistance value of the intermittent wipe cycle setting device.
Figure 4:
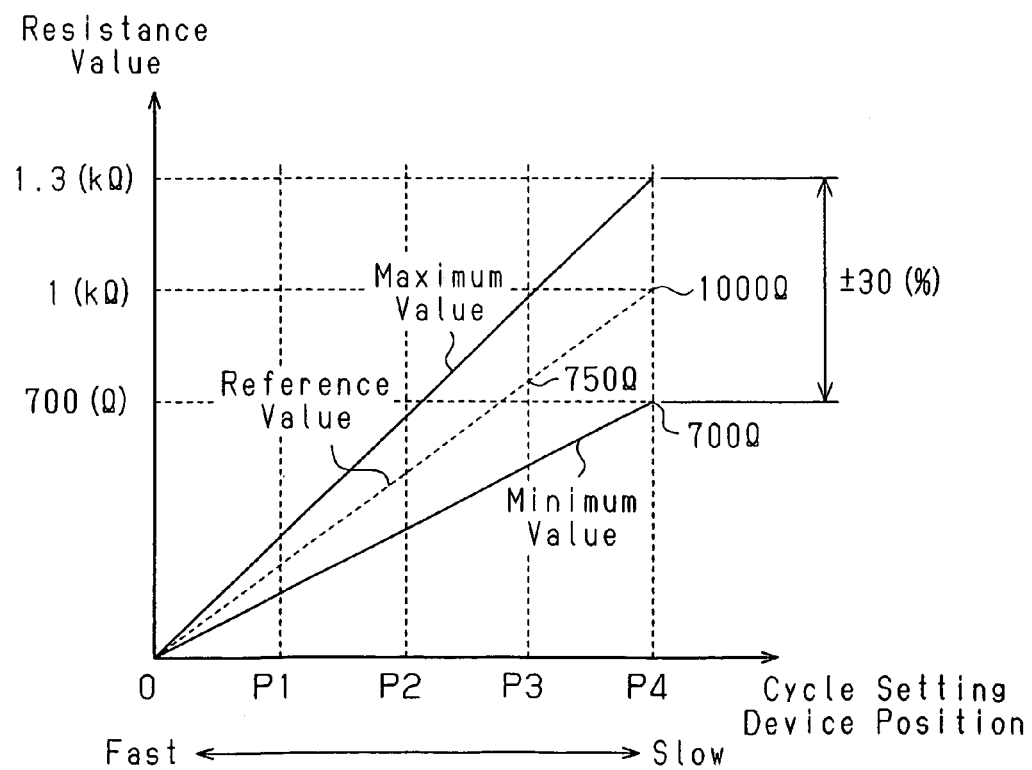
FIG. 4 is a characteristic chart showing the relationship between the position of the intermittent wipe cycle setting device and the resistance value of the intermittent wipe cycle setting device in the prior art.

Referring to FIG. 2, in step 100, the divided voltage Vin of the cycle setting device 3 is input to the computer 13. The divided voltage Vin is the actual input value when there is a variance between different cycle setting devices 3. In this process, the resistance value of the cycle setting device 3 (variable resistor 8) is less than the reference value. Thus, prior to the correction of the resistance value, the value of the divided voltage Vin is less than that when the resistance value of the cycle setting device 3 (variable resistor 8) is equal to the reference value.

In step 110, the computer 13 computes the correction value Rv for the resistance value of the cycle setting device 3 based on the learned value R1 using the equation shown below.

$Rv = R1 \times Vin/(Vcc-Vin)$

Then, in step 120, the computer 13 determines whether the correction value Rv is greater than the maximum resistance value Rvmax. When determining that the correction value Rv is greater than the maximum resistance value Rvmax, the computer 13 proceeds to step 130 and decrements the learned value to increase the relative ratio of the resistance value of the variable resistor 8 with respect to the resistance value of the pullup resistor 7. The computer 13 further proceeds to step 140 and sets the maximum resistance value Rvmax as the correction value Rv. Subsequently, the computer 13 proceeds to step 150 and sets the correction value Rv as a transmission value, which is transmitted to the wiper control ECU 5.

In step 120, when determining that the correction value Rv is less than the maximum resistance value Rvmax, the computer 13 proceeds to step 150. In step 150, the computer 13 sets the correction value Rv as the transmission value.

The computer 13 repeats the processing of steps 100 to 150 so that the correction value Rv approaches the maximum resistance value Rvmax.

In one example, the resistance value R7 of the pullup resistor 7 is 1000Ω and the reference value for the resistance value R8 of the variable resistor 8 is 1000Ω at the maximum wipe cycle position P4. Further, the resistance value R8 of the cycle setting device 3 is 700Ω.

In this case, with respect to the resistance value R8 of the variable resistor 8, if the resistance value of the pullup resistor 7 is corrected from 1000Ω to 700Ω, the voltage corresponding to the maximum wipe cycle position P4 of the cycle setting device 3 is obtained. By repeating the processing of steps 100 to 150 for a number of times in correspondence with the resistance value R8 of the variable resistor 8, the resistance value of the cycle setting device 3 may be adjusted such that voltage corresponding to the knob position of the cycle setting device 3 is input to the wiper drive unit.

During an actual computation, the computer 13 uses the output value of the A/D conversion circuit 12. In other words, the computer 13 uses an A/D converted value of the divided voltage Vin. In one example, the reference voltage Vcc is 511, the maximum resistance value Rvmax is 255, and the initial value of the learned value R1 is 366.

When the variable resistor 8 has the reference resistance value (1000Ω), the A/D converted value of the divided voltage Vin is 255. Accordingly, the computer 13 computes the correction value Rv of 364. Thus, the computer 13 decrements the learned value R1, sets the maximum resistance value Rvmax (255) as the correction value Rv, and transmits the correction value Rv to the wiper control ECU 5. By repeating these processes, the computer 13 computes the correction value RV of 255 when the learned value R1 is 255.

When the variable resistor 8 has a variance of −30%, that is, when the resistance value R8 is 700Ω, the A/D converted value of the divided voltage Vin is 210. Accordingly, the computer 13 computes the correction value Rv of 255. Thus, the computer 13 transmits the correction value Rv to the wiper control ECU 5.

When the variable resistor 8 has a variance of +30%, that is, when the resistance value R8 is 1300Ω, the A/D converted value of the divided voltage Vin is 289. Accordingly, the computer 13 computes the correction value Rv of 476. Thus, the computer 13 decrements the learned value R1, sets the maximum resistance value Rvmax (255) as the correction value Rv, and transmits the correction value Rv to the wiper control ECU 5. By repeating these processes, the computer 13 computes the correction value Rv of 255 when the learned value R1 is 196.

The preferred embodiment has the advantages described below.

(1) The position information of the cycle setting device 3 is corrected based on the computation result of the learned value R1, which is computed based on the characteristic of the cycle setting device 3 (divided voltage Vin). Thus, even if the position information of the cycle setting device 3 differs from the actual position selected by a passenger due to variances between different cycle setting devices, a correction is made to correspond with the actual position. This absorbs variances in the resistance value between different cycle setting devices so that the position information transmitted to the wiper drive unit matches the actual position information. Accordingly, variances in the cycle setting device 3 are automatically corrected.

(2) The position information of the cycle setting device 3 is corrected based on the resistance value R7 of the pullup resistor 7 (i.e., learned value R1), which forms the voltage divider. The resistance value R7 is computed based on the characteristic (divided voltage Vin) of each cycle setting device 3. Thus, the relative value of the pullup resistor 7 with respect to the variable resistor 8 is changed in accordance with the characteristic of the cycle setting device 3 so that the position information transmitted to the wiper drive unit matches the actual position information.

(3) When the correction value Rv of the cycle setting device 3 exceeds the maximum resistance value of the cycle setting device 3, the computer 13 simply decrements the resistance value of the pullup resistor 7. This simplifies processing in comparison with when the maximum resistance value of the cycle setting device 3 is computed.

It should be apparent to those skilled in the art that the present invention may be embodied in many other specific forms without departing from the spirit or scope of the invention. Particularly, it should be understood that the present invention may be embodied in the following forms.

When the correction value Rv of the cycle setting device 3 exceeds the maximum resistance value of the cycle setting device 3, the resistance value of the pullup resistor 7 is corrected (decremented) to renew the maximum resistance value of the cycle setting device 3 in the preferred embodiment. However, the learned value may be directly calculated. In such a case, the learned value R1 is obtained from the equation shown below.

$$R1 = Rvmax \times ((Vcc - Vin)/Vin)$$

In the preferred embodiment, the resistance value R7 of the pullup resistor 7 is stored as the learned value R1, the learned value R1 is computed based on the divided voltage Vin of the voltage divider, and the position information is corrected based on the computation result. However, the maximum resistance value of the variable resistor 8 may be used as a learned value that undergoes a learning process and the position information may be corrected based on this learned value. In such a case, the position information transmitted to the wiper drive unit is matched with the actual position information by correcting the position information of the cycle setting device as relative values of the maximum resistance value of the variable resistor in the cycle setting device and the maximum resistance reference value for the cycle setting device.

The present examples and embodiments are to be considered as illustrative and not restrictive, and the invention is not to be limited to the details given herein, but may be modified within the scope and equivalence of the appended claims.

What is claimed is:

1. A controller for controlling a wiper unit including a wiper and an intermittent wipe cycle setting device for setting an intermittent wipe cycle of the wiper, wherein the intermittent wipe cycle setting device is set at a plurality of positions respectively corresponding to different intermittent wipe cycles, the intermittent wipe cycle setting device has a resistance value that changes in accordance with each of the positions, the intermittent wipe cycle setting device includes a voltage divider supplied with reference voltage, the voltage divider includes a fixed resistor and a variable resistor connected in series and respectively having a fixed resistance value and a variable resistance value, and the voltage divider divides the reference voltage in accordance with the ratio of the resistance value on the fixed resistor and the resistance value of the variable resistor to generate the output signal, the intermittent wipe cycle setting device generates an output signal that is in accordance with the change in the resistance value, the controller comprising:

a computer, connected to the intermittent wipe cycle setting device, for computing position information of the intermittent wipe cycle setting device from the output signal, wherein:

the computer uses a learned value when computing the position information and adjusts the learned value based on the output signal to correct the position information; and the computer initially uses the resistance value of the fixed resistor as the learned value to compute the position information based on the output signal and adjusts the learned value based on the computation result to correct the position information.

2. The controller according to claim 1, wherein: the plurality of positions includes a maximum intermittent wipe cycle position at which the intermittent wipe cycle is set to be maximum; and the computer corrects the position information based on the output signal that is in accordance with the resistance value of the variable resistor at the maximum intermittent wipe cycle position.

3. The controller according to claim 2, wherein the computer corrects the position information based on the output signal that is in accordance with the divided voltage of the voltage divider at the maximum intermittent wipe cycle position.

4. A method for controlling a wiper unit including a wiper and an intermittent wipe cycle setting device for setting an intermittent wipe cycle of the wiper, wherein the intermittent wipe cycle setting device is set at a plurality of positions respectively corresponding to different intermittent wipe cycles, the intermittent wipe cycle setting device has a resistance value that changes in accordance with each of the positions, the intermittent wipe cycle setting device generates an output signal that is in accordance with the change in the resistance value, the intermittent wipe cycle setting device includes a voltage divider supplied with reference voltage, the voltage divider includes a fixed resistor and a variable resistor connected in series and respectively having a fixed resistance value and a variable resistance value, and the voltage divider divides the reference voltage in accordance with the ratio of the resistance value of the fixed resistor and the resistance value of the variable resistor to generate the output signal, the method comprising the steps of:

computing position information of the intermittent wipe cycle setting device from the output signal by using a learned value; and correcting the position information by adjusting the learned value based on the output signal;

wherein the step of computing position information includes initially using the resistance value of the fixed resistor as the learned value to compute the position information based on the output signal and adjusts the learned value based on computation result to correct the position information.

5. The method according to claim 4, wherein the plurality of positions includes a maximum intermittent wipe cycle position at which the intermittent wipe cycle is set to be maximum, and the step of computing position information includes:

computing the position information based on the output signal that is in accordance with the resistance value of the variable resistor at the maximum intermittent wipe cycle position.

6. The method according to claim 5, wherein the step of computing position information includes:

computing the position information based on the output signal that is in accordance with the divided voltage of the voltage divider at the maximum intermittent wipe cycle position.

\* \* \* \* \*